US011301439B2

(12) United States Patent
Athey et al.

(10) Patent No.: US 11,301,439 B2
(45) Date of Patent: *Apr. 12, 2022

(54) SYSTEM AND METHOD FOR OBJECT MIGRATION USING WAVES

(71) Applicant: INTERNATIONAL BUSINESS MACHINES CORPORATION, Armonk, NY (US)

(72) Inventors: Richard K. Athey, Leander, TX (US); John K. Baker, Taylorsville, UT (US); Ronda L. Caswell, Broomfield, CO (US); Steve N. Lee, Jacksonville, FL (US); Matthew A. Markley, Hays, KS (US); Birgit Pfitzmann, Wettswil (CH); Michael Tacci, Downingtown, PA (US); Bruce G. Taylor, Golden, CO (US); Tylon O. Willingham, Winchester, CA (US)

(73) Assignee: International Business Machines Corporation, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/854,027

(22) Filed: Apr. 21, 2020

(65) Prior Publication Data

US 2020/0250156 A1     Aug. 6, 2020

Related U.S. Application Data

(63) Continuation of application No. 15/926,587, filed on Mar. 20, 2018, now Pat. No. 10,664,456, which is a
(Continued)

(51) Int. Cl.
*G06F 16/21*     (2019.01)
*G06F 16/28*     (2019.01)
*G06Q 10/06*     (2012.01)

(52) U.S. Cl.
CPC ...... *G06F 16/214* (2019.01); *G06F 16/285* (2019.01); *G06Q 10/06* (2013.01)

(58) Field of Classification Search
CPC ...... G06F 16/214; G06F 16/285; G06Q 10/06
See application file for complete search history.

(56) References Cited

U.S. PATENT DOCUMENTS

| 7,379,996 B2 | 5/2008 | Papatla et al. |
| 2005/0010919 A1* | 1/2005 | Ramanathan ............. G06F 8/61 717/174 |

(Continued)

FOREIGN PATENT DOCUMENTS

| CN | 1696902 A | 11/2005 |
| JP | 2009116859 | 5/2009 |

(Continued)

OTHER PUBLICATIONS

International Search Report and Written Opinion for corresponding International Patent Application No. PCT/US11/20384. dated Mar. 7, 2011. (14 Pages).

(Continued)

*Primary Examiner* — Minh Chau Nguyen
(74) *Attorney, Agent, or Firm* — Tutunjian & Bitetto, P.C.; Kurt Goudy

(57) ABSTRACT

A system and method for information technology (IT) migration includes determining a relationship among objects to be migrated such that the relationship includes a set of objects having at least one of a common feature or dependency between the objects in the set. The objects are grouped into a plurality of migration waves such that cross-wave relationships are minimized among the plurality of migration waves. The objects are migrated wave by wave.

20 Claims, 4 Drawing Sheets

Related U.S. Application Data continuation of application No. 14/858,664, filed on Sep. 18, 2015, now Pat. No. 9,971,795, which is a continuation of application No. 12/713,920, filed on Feb. 26, 2010, now Pat. No. 9,141,919.

(56) References Cited

U.S. PATENT DOCUMENTS

| | | |
|---|---|---|
| 2005/0251802 A1 | 11/2005 | Bozek et al. |
| 2006/0179171 A1 | 8/2006 | Stefaniak et al. |
| 2007/0011669 A1* | 1/2007 | Varma .................. G06F 8/51 717/168 |
| 2007/0078941 A1 | 4/2007 | Dun et al. |
| 2007/0094375 A1 | 4/2007 | Snyder et al. |
| 2007/0192406 A1 | 8/2007 | Frietsch et al. |
| 2007/0240143 A1* | 10/2007 | Guminy .................. G06F 8/70 717/168 |
| 2007/0250621 A1 | 10/2007 | Hillier |
| 2007/0250829 A1 | 10/2007 | Hillier et al. |
| 2007/0276826 A1 | 11/2007 | Chand et al. |
| 2008/0077366 A1 | 3/2008 | Neuse et al. |
| 2008/0082476 A1 | 4/2008 | Mourra et al. |
| 2008/0098385 A1 | 4/2008 | Alger et al. |
| 2008/0209043 A1 | 8/2008 | Ajiro |
| 2009/0006493 A1* | 1/2009 | Draper .................. G06F 8/71 |
| 2009/0235265 A1 | 9/2009 | Dawson et al. |

FOREIGN PATENT DOCUMENTS

| | | |
|---|---|---|
| JP | 2009130751 | 6/2009 |
| TW | 200712912 A | 4/2007 |
| WO | WO2009110616 | 9/2009 |

OTHER PUBLICATIONS

Arora, S., et al. "Geometry, Flows, and Graph-Partitioning Algorithms" Communications of the ACM. vol. 51, No. 10. Oct. 2008. pp. 96-105.

Kind, A., et al. "Relationship Discovery With Netflow To Enable Business-Driven It Management" In Proceedings of IEEE/IFIP International Workshop on Business-Driven IT Management (BDIM 2006), Apr. 2006. (8 Pages).

Singh, A., et al. "Brief Announcement: Integrated Resource Allocation in Heterogeneous San Data Centers" PODC 2007. Proceedings of the Twenty-Sixth Annual ACM Symposium on Principles of Distributed Computing. Aug. 2007. pp. 328-329.

Verma, A., et al. "PMAPPER: Power and Migration Cost Aware Application Placement in Virtualized Systems" Middleware 2008, ACM/IFIP/USENIX 9th International Middleware Conference. Lecture Notes in Computer Science. Dec. 2008. pp. 243-264.

* cited by examiner

SYSTEM AND METHOD FOR OBJECT MIGRATION USING WAVES

BACKGROUND

The present invention relates to system migration and object migration in computing environments, and more particularly to wave planning and execution for performing the migration.

Migration is the process of transferring data, programs, applications, etc. between storage types, formats, computer systems, etc. Migration may be partially performed programmatically to achieve a partially automated migration, freeing up human resources from tedious tasks. When organizations or individuals change computer systems or upgrade to new systems, or when organizations merge, migration is usually employed. During migration, information, programs, etc. on an old system is mapped to a new system relating old data formats, etc. to the new system's formats and requirements.

In information technology (IT) migration projects, it is difficult to migrate all objects that are to be migrated at the same time. However, it is also not desirable to migrate object by object, because many steps such as placement optimization, mutual addressing of the migrated objects, and testing of overall applications, are better performed with many objects together.

IT migration activities include server and application consolidation, transformation, virtualization, etc. One aspect of migration is that certain software objects, such as applications, middleware, or entire operating system images, are to be moved to a different platform, such as other servers, other operating systems, other middleware versions or types, or another environment such as clouds. When an enterprise decides on a migration project, the goal is typically to migrate a large number of objects, so that the resulting savings exceed the planning and execution costs of the migration project. However, one cannot usually move all the objects at once or even a subset that is selected to be migrated. One reason is that migration is time-consuming. Another reason may be that costs do not permit acquiring all the desired new hardware at the same time, or if the migration is done to consolidate existing hardware or existing facilities, hardware or floor space may need to be freed up by migrating some objects, before migrating other objects.

The opposite extreme, i.e., migrating objects one by one, is also not desirable. For example, one typically wants to move an entire business application at once so that it only needs to be tested once. Furthermore, if one object uses or addresses another object, migrating the used or addressed object means that changes in the using or addressing object need to be made, and the two objects should best be migrated together. Another reason for migrating interacting objects at the same time is related to geographic closeness or good network connectivity. The overall application may not be able to have the desired throughput or latency if some objects have already been migrated and others have not.

SUMMARY

A system and method for information technology (IT) migration includes determining a relationship among objects to be migrated such that the relationship includes a set of objects having at least one of a common feature or dependency between the objects in the set. The objects are grouped into a plurality of migration waves such that cross-wave relationships are minimized among the plurality of migration waves. The objects are migrated wave by wave.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Figure 1:
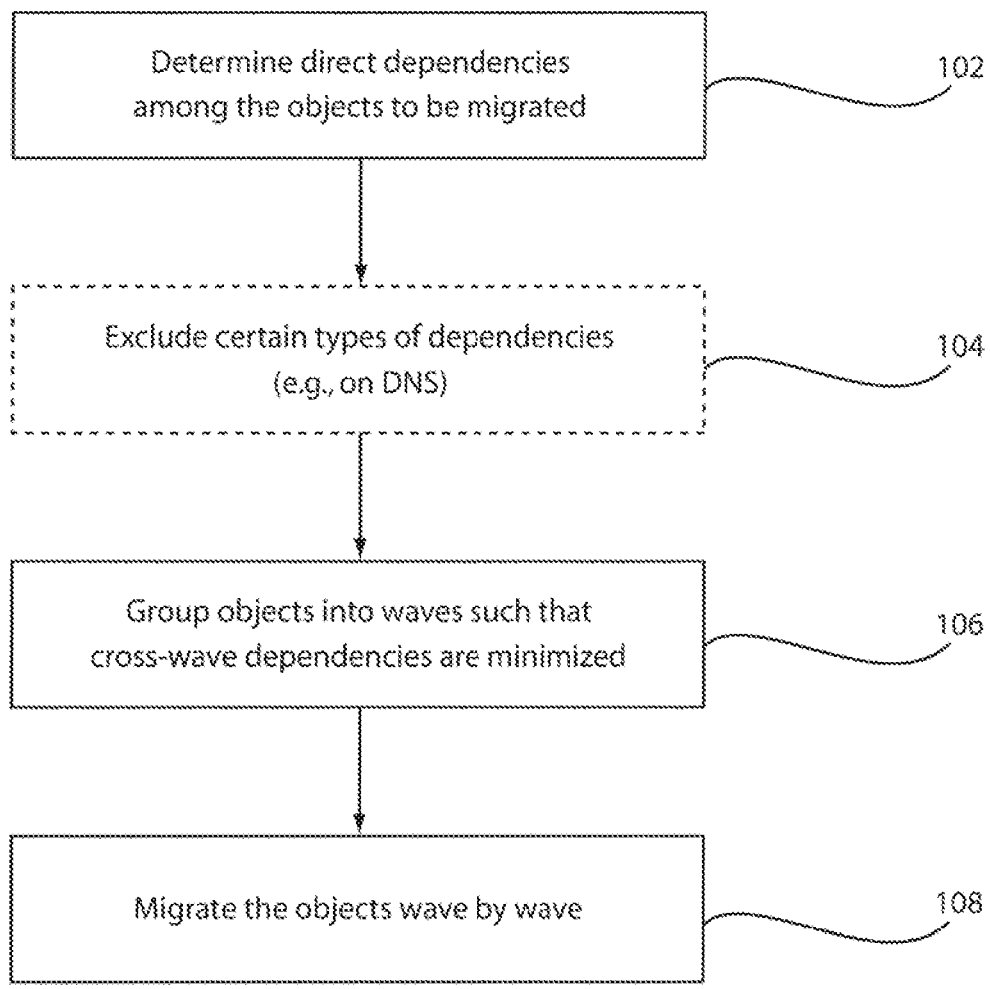
FIG. 1 is a block/flow diagram showing a system/method for migrating objects in accordance with the present principles.

In accordance with the present principles, objects are grouped in a wave or waves. A wave is a set of objects that are to be migrated as a logical group and more or less at the same time. Wave planning is needed for cost-effective overall migration projects. Aspects of the present invention may be applicable to a wider range of use cases where information technology (IT) objects need to be grouped, e.g., in planning for recovery strategies, or in analyzing the value of IT for a business.

In a particularly useful embodiment, the objects are grouped according to dependencies, so that most dependencies end up inside one wave, and cross-wave dependencies or relationships only minimally exist. Every object that was decided to be migrated is preferably placed in only one wave after the wave planning; however, sometimes one or more of the initial objects would be replicated or divided up into the objects to be actually migrated depending on need or practical concerns. The dependencies may be weighted. Underlying direct dependencies may be discovered with automated discovery technologies, but the present invention also provides for targeted questioning of users about potentially missed dependencies.

In addition to the dependencies, the objects may have some attributes that are relevant for wave planning. For example, one may prefer the waves to align with business applications, business ownership, datacenter locations, operating platforms, etc. Some embodiments permit such attributes to be taken into account. For attributes such as "business application" that are not technically defined, we provide for deriving them from partial human inputs. Embodiments permit for automatic grouping into waves as well as offering support for users, such as application architects or infrastructure architects, to make certain decisions with graphical support by an automated system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages such as a scripting language such as Perl, VBS or similar languages or functional languages such as Lisp and ML and logic-oriented languages such as Prolog. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1, a block/flow diagram shows a system/method for wave migration in accordance with the present principles. In block 102, dependencies, wave-relevant attributes of objects, e.g., location, business application, etc., or other classification features are discovered or determined. A computer automated system is preferably provided to automate the process. Here, associations, relationships or other grouping criteria are discovered or derived.

In block 104, certain types of dependencies (or other relationships) may be excluded. For example, dependencies to a domain name server (DNS) may be excluded. Dependencies may be excluded where such dependencies do not differentiate objects in the wave plan. One may also exclude dependencies to objects that have a particularly high number of dependencies, because such dependencies also do not differentiate the other objects in the wave plan.

In block 106, objects are grouped into waves. In a particularly useful embodiment, objects with the same wave-relevant attributes or relationships are placed in a same wave. The dependencies may be used to augment incomplete user input on wave-relevant attributes (e.g., incompletely known mapping to business applications). Weights for different dependencies may be provided to place importance on certain dependencies for object migration order and grouping. The actual grouping may be provided by solving a graph partitioning problem. In block 108, the objects are migrated wave by wave in accordance with the wave plan.

In accordance with the present principles, direct dependencies and their discovery will now be described in greater detail. An element in accordance with the present principles is to use dependencies of IT objects as a basis for wave planning. By a "direct dependency" from object 1 to object 2, it is meant that object 1 directly interacts with object 2. In server migration and consolidation, the main type of direct dependency is that object 1 establishes a network connection to object 2. Direct dependencies can be found in many ways. For example, the relationships may be determined using one or more of network observation, observation of network statistics on computers, observation of and analyzing dependency configurations of the objects and underlying communication software stack, analysis of application log files to identify the relationship, using input by a user etc.

There is no automated method yet that, within reasonable discovery time, is absolutely guaranteed to discover all dependencies. It is useful to inquire to users or owners of the IT objects about the dependencies of which they may be aware. This may be supported by information from automated discovery, which is the preferred and primary method for collecting information about dependencies. For example, if an object is discovered that listens for connections on a certain port, but no connections have been observed or found in log files, one may ask users specifically what connections this object is waiting for. Similarly, if an IT object seems to have no connections at all or only administrative connections, users may be asked whether it is likely that this is an unused or standalone object, or what its dependencies might be.

In one embodiment, each dependency may be represented as a 4-tuple: e.g., (Source IP address, Source port, Destination IP address, Destination port). This 4-tuple may be seen as a dependency between two servers. Each server is characterized by IP address(es), and two ports provide an additional "label" of the dependency. The 4-tuple may also be seen as a dependency between two applications. In this case, the source application is characterized by the pair (Source IP address, Source port), and the destination application is characterized by the pair (Destination IP address, Destination port).

Additional results of discovery may also be employed to represent dependencies in terms that are easier to interpret by humans. For example, we may use DNS addresses of the servers instead of the IP addresses, and we may use the names of applications. 4-tuples may be obtained as in the following example: (Server1.mycompany.com, WebSrv.exe, Server2.mycompany.com, DB.exe), which denotes that program WebSrv.exe (probably a web server) on Server 1 of mycompany has a direct dependency to the program DB.exe (probably a database) on Server 2 of mycompany. In addition, well-known middleware and applications may have fixed program names or other discoverable characteristics, so that we can actually deduce that WebSrv.exe is a web server of a certain vendor and type, and DB.exe is a database of a certain vendor and type.

The IT objects together with their direct dependencies may be considered a directed graph, with the objects as nodes and the direct dependencies as edges. A multi-graph, where multiple distinguished dependencies (edges) may exist between two IT objects (nodes), may also be created or provided. For example, if primary IT objects are servers, a server A may have multiple dependencies on a server B because several applications on server A depend on one or more applications on server B. Even if the primary IT objects are applications, it may be useful to distinguish multiple dependencies, e.g., if an application C interacts with another application D both by Java calls and via a web interface.

The edges of the graph or multi-graph may be labeled, e.g., with the type of communication protocol used by a connection that defines the direct dependency. There are many known methods for representing graphs and multi-graphs in computer storage (e.g., as separate database tables, embedded in database tables representing the objects, in XML files, or in spreadsheets). All such methods can be used within the scope of the present invention. In addition, there are many known ways for representing graphs and multi-graphs to users. All such methods can be used within the scope of the present invention.

Figure 2:
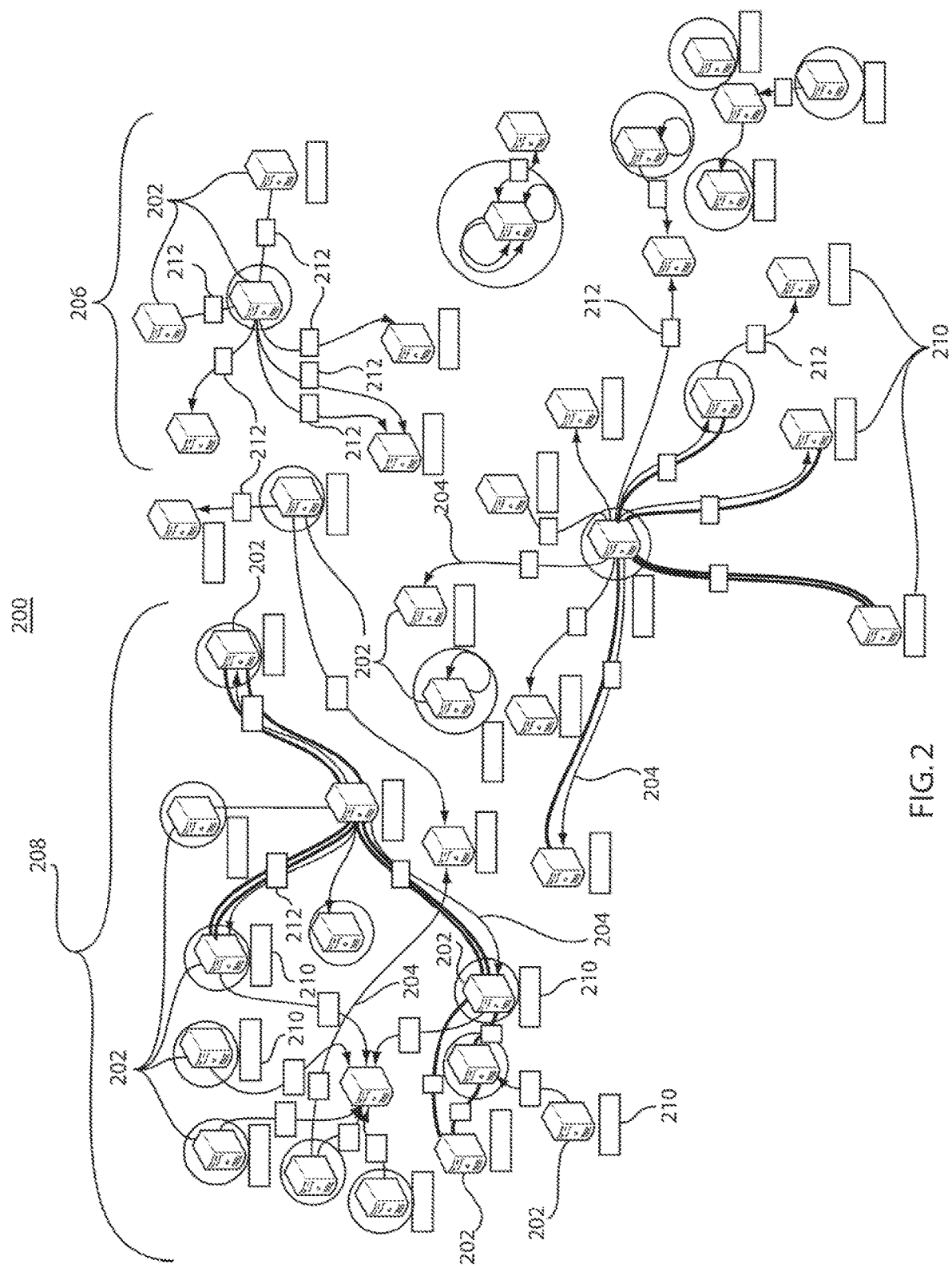
FIG. 2 is a configuration graph illustratively showing relationships between objects in a system in accordance with the present principles.

Referring to FIG. 2, an illustrative dependency graph is shown. In this case, IT objects (graph nodes 202) are servers characterized by IP addresses. Edges 204 are labeled with the destination program or service. From a representation as in FIG. 2, dependencies are employed to begin to plan waves. For example, six servers (nodes 202) form a connectivity component 206 of the graph (i.e., they are connected among each other, but not to any other servers). Hence, they may form a useful wave. This can be seen by a user (e.g., a migration specialist), but it can also be determined by an automated method that determines connectivity components. Known methods may be employed for discovering such connectivity components.

However, even if only dependencies are considered (and not attributes or other features), it is not the typical case that connectivity components can immediately be used as waves. In particular, many connectivity components are too large to form good waves. Consider a connectivity component 208 as an example. For example, there may not be enough people or empty target servers to migrate so many objects at the same time. One method that can be used is to slice up connectivity components according to a min-cut condition and for a certain maximum wave size, e.g., a maximum wave size may be given by a server number if the objects under consideration are servers or workloads on servers. Then, connectivity components may be cut up into server groups of at most this size so that a minimum number of dependencies crosses the groups.

Application and infrastructure architects may make final decisions on waves, and may employ automated support for dependency analysis and visualization. The remaining problem (if the architects have no additional undocumented criteria) is a "graph partitioning" problem, and any known algorithm may be employed to solve the problem. The graph partitioning is an automated alternative to what the humans do, or can be used to make automated proposals before humans make final decisions. In the graph partitioning problem, a graph is given, and the goal is to split the graph into pieces (often initially two pieces, but the procedure can be repeated) while minimizing the number of edges that cross the cut. This may be performed on the dependency graph as the graph, and the waves as the desired pieces. Solving the problem in an optimal way is NP-hard and thus currently infeasible for large graphs. Fast and good approximation methods, i.e., methods that find a cut where not many more edges than the theoretical minimum cross the cut, exist. A good overview of such approximation methods for graph partitioning can be found in, e.g., "Geometry, Flows, and Graph-Partitioning Algorithm" by Sanjeev Arora, Satish Rao, and Umesh Vazirani, Communications of the ACM, Vol. 51, No. 10, October 2008, pp. 96-105, incorporated by reference.

It is preferable to take desired semantics of the waves into account, rather than planning waves by a pure graph-theoretical method. In one embodiment, this means taking particular knowledge about migration processes into account. For example, when deciding upon waves, generic infrastructure dependencies may not be of interest (see block 104), such as dependencies on patch management servers, monitoring servers, domain name servers, or identity management servers. One reason is that these servers might be newly set up in the new infrastructure anyway. Another reason is that these dependencies may make the output for users unreadable.

There are several ways to remove such dependencies in block 104. For example, a preconfigured list of typical infrastructure dependencies may be provided. A user may choose to exclude or include them. A user may freely choose other types of dependencies (by their labels 212) that should be excluded. The user may interactively see the graph with as many types of dependencies included or excluded as they like. For example, a user may notice in the graph that many dependencies have a same label, and ask to see the graph without all the dependencies with this label. Nodes, servers or objects 202 may be labeled as well with labels 210.

The automated system can identify likely candidates of dependency types for exclusion according to their frequency. A frequency can be computed either in the sense of a graph (at most one dependency with label "X" from a server A to another server B is counted) or of a multigraph (all dependencies with label "X" from a server A to another server B are counted). A high frequency of a dependency type may be an important indicator for deciding that a previously unclassified dependency type is an infrastructure dependency rather than a business-level application dependency, and thus a candidate for omission in either or both of uncluttering a graph for a human user and an automated wave planning method.

If utilization data of dependencies is available, these dependencies may be weighted according to their utilization. Instead of completely deleting dependency types from a graph for human or automated analysis, weighting may be employed according to the importance of the dependency types for wave planning. In particular, an estimate of the additional effort needed to perform migration and testing if a dependency becomes a cross-wave dependency instead of an intra-wave dependency may be provided as weight criteria. For example, one may judge a dependency from a web server to an application simpler than a dependency from an arbitrary application to another arbitrary application, because it is easier to reconfigure and test a web route in the web server when the application is migrated in another wave, than having to reconfigure (or even reprogram) and test an arbitrary application.

Wave planning may depend on server and application dependencies. However, the present principles permit attributes of the individual IT objects to be taken into account in the wave planning. In one embodiment, arbitrary attributes are employed in wave planning. In particularly useful embodiments, specific attributes are employed. These attributes are defined in the underlying model of IT objects to be migrated. These attributes may include object types, data types, author, related application, etc.

Business applications and their initial identification are particularly useful attributes for wave planning. Business applications may include a unit of interacting software components that form one application from the point of view of the business, e.g., "travel expense handling" or "back-end cheque processing". There is no unique definition of business applications, and the business application is usually not directly represented in the actual software components to which business application(s) belongs. Most enterprises employ such a notion or understanding of a business application, as well as business application owners, test plans for business applications, etc. These notions of joint ownership and tests are what makes business applications important for wave planning, e.g., it is preferred that a business application be migrated as a whole, and without affecting other business applications.

A business application may be considered an attribute of the IT objects that belong to it. However, this may be a multivalued attribute (e.g., a database or a server may be used in more than one business application). It may be represented in any of the many known ways of representing multi-valued attributes, e.g., to name only a few, by a separate table for business applications and corresponding IT objects in a database, by a separate class in an object-oriented model with relations to the corresponding IT objects, by multiple sub-elements for business applications within IT object elements in an XML model, etc. Because business applications may not be explicitly represented in IT objects; identifying them needs human input. For example, the business owners interested in migration can identify what business applications are involved, and together with IT personnel of the respective organizational units, they can identify some IT objects that are involved in each business application. This initial input for one large business application was indicated in by circled servers in FIG. 2.

Identifying entire business applications and relations to wave planning may be initially performed using human input, but may also be performed automatically using computer automated systems. Given the initial inputs, automated methods may be employed to find the IT objects belonging to a business application, more completely, in particular by following the dependencies between objects. In other words, human input may be used to refine the automated or semi-automated methods for wave planning. In particular, preference may be given to waves that include entire business applications. Specific methods that may be employed to identify member objects to a business application and to aid in planning waves that are aligned with business applications may include, e.g.:

introducing specific penalties in a weighing method for business applications that extend over more than one wave;

introducing pseudo-dependencies for the weighing method between IT objects that human input placed in the same business application;

proposing and visualizing groups constructed by following dependencies for a certain number n of hops in the graph starting from known members of a business application;

following exclusively, or with stronger weight, the "forward" dependencies of the known members of a business application;

identifying as in the previous two items, but refined for IT tiers that known members of a business application belong to, e.g., if humans could identify certain front-end applications and databases as belonging to certain business applications, one may, e.g., choose to follow dependencies from the databases only forward by 1 hop, but dependencies from the front-end applications forward by 3 hops and backwards by 1 hop.

Visualization techniques (e.g., on a display screen) for such proposed groupings include only showing one group, showing the members of each business application in a certain color, texture, etc., possibly in a lighter version of the same color for derived members, highlighting conflicts (i.e., IT objects that belong to more than one group according to the current grouping criterion) and/or showing them with all applicable colors in a certain pattern, etc.

Another attribute (instead of or in addition to business applications) is the location of a server. The correlation between dependencies and location is weak; hence, dependencies are not typically used to identify locations of IT objects where the location is not known initially. Once locations are identified, one can weigh "same location" in the grouping method similar to the "same business application" as described above, or even by detailed cost functions for freeing up space.

Other attributes that may be considered in wave planning are server functions or environments, e.g., development versus test versus production. This can be treated in a similar way to business applications as illustratively described above. Another attribute may include a server platform, e.g., preferably moving only applications on one operating system in one wave for easier assignment of personnel. Several attributes may be considered together, e.g., business application and location, with appropriate weights, etc., in the methods.

Figure 3:
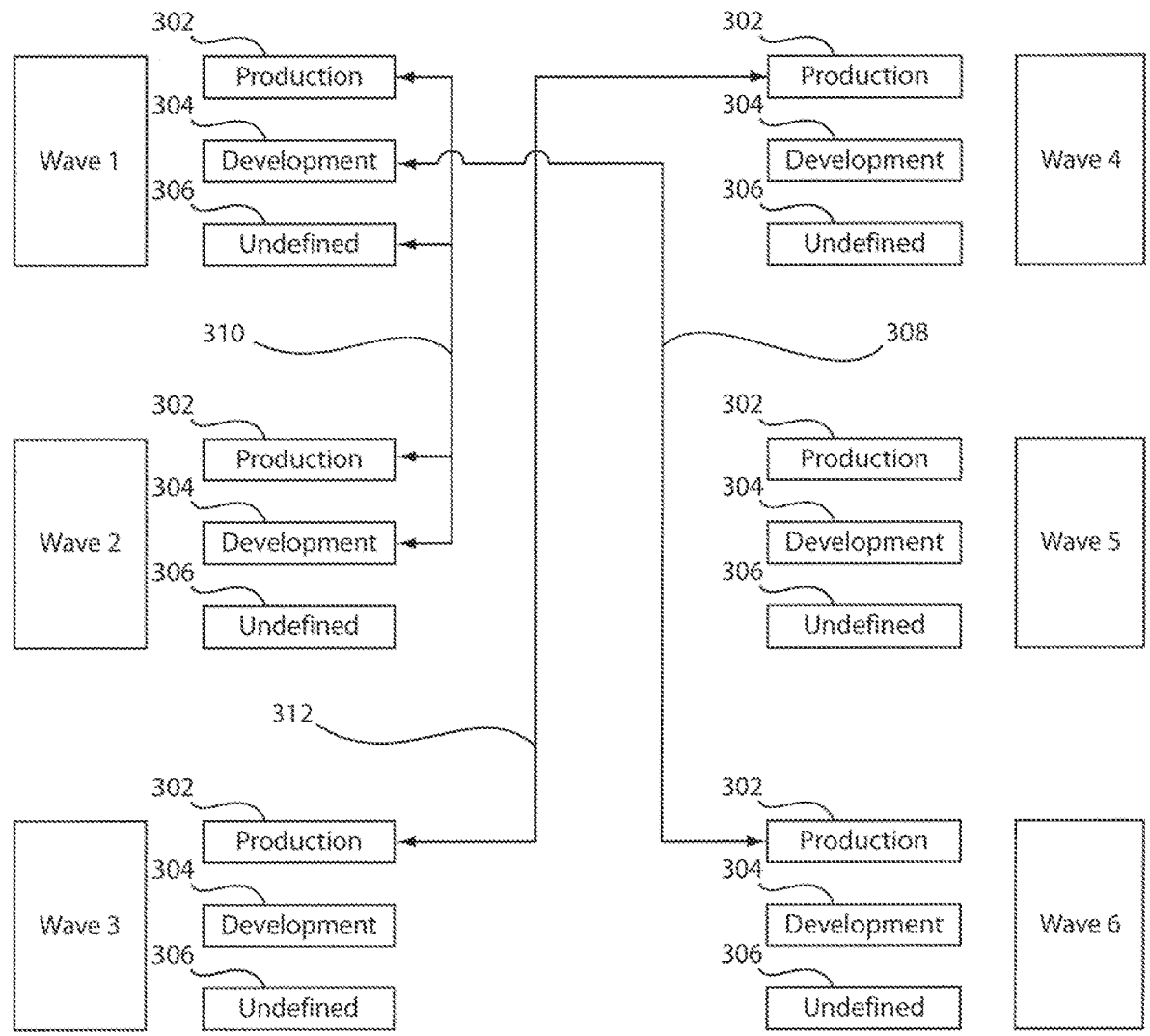
FIG. 3 is a diagram showing cross-wave dependencies in accordance with a wave plan in accordance with the present principles.

Referring to FIG. 3, a cross-wave dependency diagram illustratively shows migration of objects in accordance with a wave plan. At the end of the wave planning, or as an intermediate tool for human users, the remaining cross-wave dependencies for a certain wave plan may be summarized. The grouping criteria are employed to group objects for wave by wave migrations. The wave assignments may be performed in accordance with the weighted object groupings which provide an importance measure. In addition the groupings determine which objects are included in each wave. A number of waves is estimated and a duration, cost or other metric of migration may be assigned to the wave. The waves should be scheduled in accordance with the migration criteria, e.g., cost, down time, importance of applications, etc.

FIG. 3 shows a scenario with six waves (1-6) and for an attribute server environment, which attribute can take the values production 302, development 304, and undefined 306 corresponding to each wave. For example, an arrow 308 shows a cross-dependency in both directions between the development part of wave 1 and the production part of wave 6, while wave 5 is perfect in the sense that it is independent of other waves (no dependencies). In another example, an arrow 310 shows a dependency in both directions between the production, development and undefined parts of wave 1 and the production and development parts of wave 2. In another example, an arrow 312 shows a dependency in both directions between the production part of wave 3 and the production part of wave 4. While these cross-dependencies are preferably avoided, the cross-dependencies may be employed to shift wave groupings, the order of the waves, etc.

Other use cases: Groupings of objects similar to those used for wave planning in migration projects are also useful for other IT management purposes, in particular, for use with other types of IT transformation projects. One class of examples may include reliability, availability, and disaster recovery planning, where one may also want to make consistent plans for object groups similar to the waves described herein. Another class of examples is routine maintenance and change management, where object groups may be treated as the waves described herein.

Figure 4:
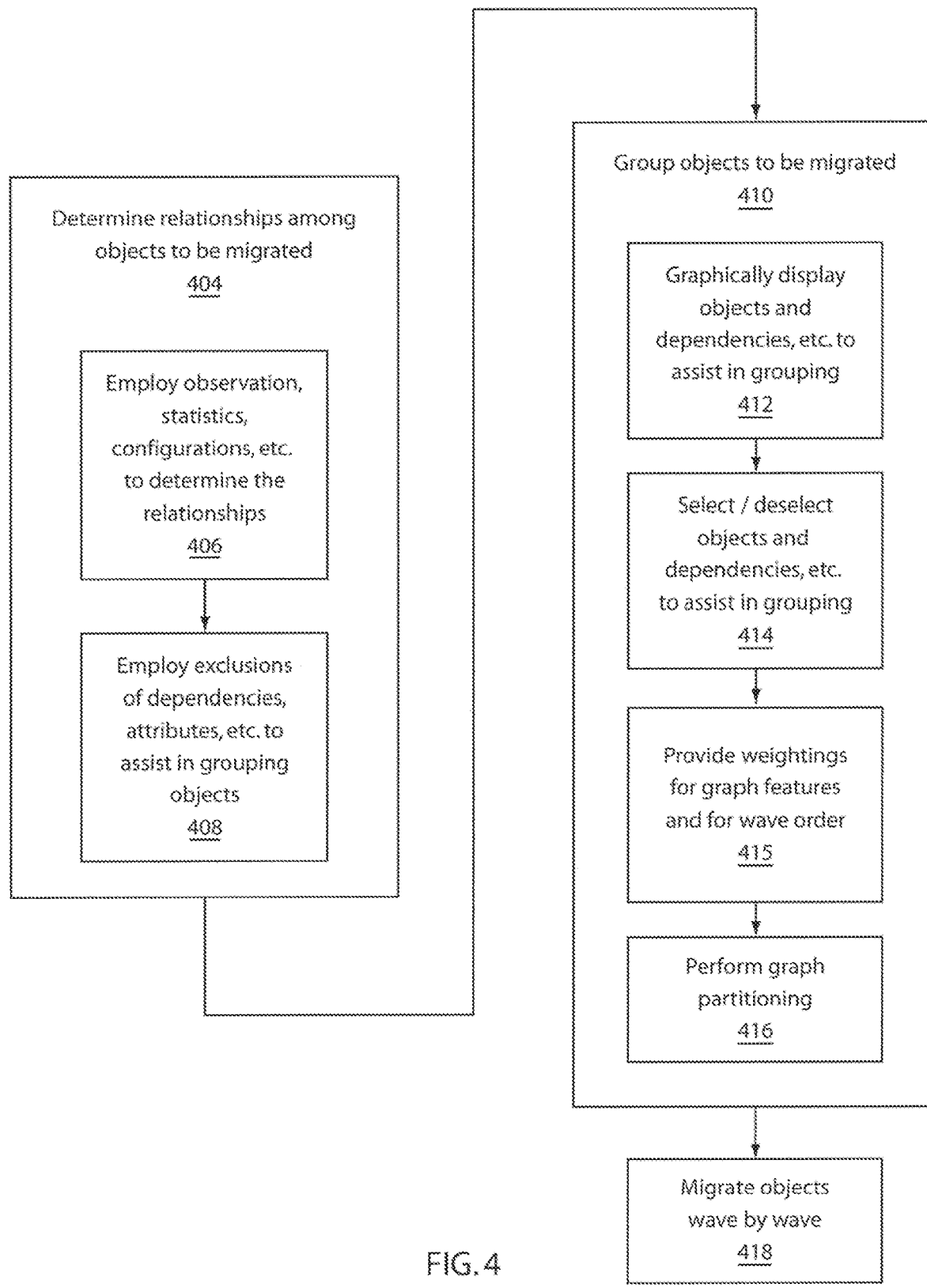
FIG. 4 is a block/flow diagram showing a system/method for wave planning and wave migration of objects in accordance with the present principles.

Referring to FIG. 4, a block/flow diagram shows a system/method for wave planning and migration in accordance with an illustrative embodiment. In block 404, a relationship among objects to be migrated is determined such that the relationship includes a set of objects having at least one common feature, dependency, or common attribute between the objects in the set. The relationship may include at least one of a direct dependency, a common attribute, a common application, a common location among the objects, etc. The objects may include software applications, middleware, a workload on a computer, etc.

In block 406, a relationship may be determined by employing one or more of network observation, observation of network statistics on computers, observation of and analyzing dependency configurations of the objects and underlying communication software stack, analysis of application log files to identify the relationship, etc. The relationships may also be determined by employing dependencies or common attributes input by a user. In block 408, the relationships may be determined or the determination of relationships simplified by excluding a dependency type or types, or dependencies to particular objects or object types, to assist in the grouping of the objects.

In block 410, the objects are grouped into a plurality of migration waves such that cross-wave relationships are minimized among the plurality of migration waves. The groups may be based on relationships determined in block 404. The relationships between objects may include wave-relevant attributes of the objects, and the grouping the objects include placing the objects with a same wave-relevant attribute in a same wave using these relationships. The wave-relevant attributes may include one or more of a business application, a business owner, a datacenter location, a characteristic of a server platform, etc.

In block 412, the dependencies between the objects (and/or the wave-relevant attributes) may be graphically displayed to aid in grouping objects for waves. Similar indicia may be used to indicate similar attributes, objects, groupings etc. in a graph or display. A mapping or other designation of a computing system is provided or created to indicate objects or items to be migrated, and node information with regard to objects to be migrated. This may include the use or creation of a directed graph, a multi-graph or other representation. In block 414, the dependencies or types of dependencies, the wave-relevant attributes or any other feature may be selected or deselected to assist in determining the objects to be included or excluded from the groupings of the objects. The selection and/or deselection may be indicated in the graphical representation.

In block 415, the relationships (e.g., dependencies, attributes or other features in the graph) may be weighted to bias groupings of the objects. For example, a particular business application, application location, dependency type, etc. may be deemed more important and may receive a higher weight that would influence which wave the objects should be placed in. The order of migration may also be influence by the weighting. This may include importance weights which could help prioritize which wave of objects are migrated first, and in which order the migration waves should continue. The grouping the objects may also include solving a graph partitioning problem in block 416. The graph partitioning takes these weights into account.

In block 418, the objects are migrated wave by wave. This migration is preferably conducted in accordance with a wave plan. The wave plan may include evaluating waves or groups of objects in accordance with criteria. The criteria may include cost, performance metrics, speed of migration, importance or any other criteria. The criteria may be user determined.

Having described preferred embodiments of a system and method for object migration using waves (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims.

Having thus described aspects of the invention, with the details and particularity required by the patent laws, what is claimed and desired protected by Letters Patent is set forth in the appended claims:

1. A computer-implemented method for information technology (IT) migration, comprising:
   determining a relationship among software objects, the determining including selecting or deselecting wave-relevant attributes to determine which of the objects to include or exclude from groupings of the objects;
   grouping the objects into a plurality of migration waves based on the determined relationship; and
   migrating the objects wave by wave.

2. The method as recited in claim 1, wherein determining the relationship includes determining wave-relevant attributes of the objects, and wherein grouping the objects includes placing the objects with a same wave-relevant attribute in a same wave.

3. The method as recited in claim 2, wherein the wave-relevant attributes include one or more of a business application, a business owner, a datacenter location, and a characteristic of a server platform.

4. The method as recited in claim 2, further comprising:
   graphically displaying the wave-relevant attributes where similar indicia indicate similar attributes.

5. The method as recited in claim 1, wherein determining a relationship includes employing at least one of a direct dependency, a common attribute, a common application and a common location among the objects.

6. The method as recited in claim 1, wherein determining a relationship includes excluding a dependency type to assist in the grouping of the objects.

7. The method as recited in claim 1, wherein the objects include at least one of software applications, middleware, and a workload on a computer.

8. The method as recited in claim 1, wherein determining the relationship includes employing one or more of network observation, observation of network statistics on computers, observation of and analyzing dependency configurations of the objects and underlying communication software stack, and analysis of application log files to identify the relationship.

9. The method as recited in claim 1, wherein determining the relationship includes employing dependencies input by a user.

10. The method as recited in claim 1, further comprising:
    graphically displaying dependencies between the objects; and
    selecting or deselecting the dependencies or types of dependencies to assist in determining the objects to be included or excluded from groupings of the objects.

11. The method as recited in claim 1, further comprising weighting the relationships to bias groupings of the objects.

12. The method as recited in claim 1, wherein grouping the objects minimizes cross-wave relationships among the plurality of migration waves.

13. A computer readable storage medium comprising a computer readable program for information technology (IT) migration, wherein the computer readable program when executed on a computer causes the computer to perform the steps of:
    determining a relationship among software objects, the determining including selecting or deselecting wave-relevant attributes to determine which of the objects to include or exclude from groupings of the objects;
    grouping the objects into a plurality of migration waves based on the determined relationship; and
    migrating the objects wave by wave.

14. The computer readable storage medium as recited in claim 13, wherein determining a relationship includes employing at least one of a direct dependency, a common attribute, a common application and a common location among the objects.

15. The computer readable storage medium as recited in claim 13, wherein determining a relationship includes excluding a dependency type to assist in the grouping of the objects.

16. The computer readable storage medium as recited in claim 13, wherein the objects include at least one of software applications, middleware, and a workload on a computer.

17. The computer readable storage medium as recited in claim 13, wherein determining the relationship includes employing one or more of network observation, observation of network statistics on computers, observation of and analyzing dependency configurations of the objects and underlying communication software stack, and analysis of application log files to identify the relationship.

18. The computer readable storage medium as recited in claim 13, wherein determining the relationship includes employing dependencies input by a user.

19. The computer readable storage medium as recited in claim 13, wherein determining the relationship includes determining wave-relevant attributes of the objects, and wherein grouping the objects includes placing the objects with a same wave-relevant attribute in a same wave.

20. A system for information technology (IT) migration, comprising:
    a processor device operatively coupled to a non-transitory computer-readable storage medium, the processor device being configured for:
    determining a relationship among software objects, the determining including selecting or deselecting wave-relevant attributes to determine which of the objects to include or exclude from groupings of the objects;
    grouping the objects into a plurality of migration waves based on the determined relationship; and
    migrating the objects wave by wave.

* * * * *